United States Patent [19]
Dolfini et al.

[11] 3,867,379
[45] Feb. 18, 1975

[54] 7-SUBSTITUTED CEPHALOSPORANIC ACID AND DERIVATIVES THEREOF

[75] Inventors: Joseph Edward Dolfini, Princeton; Ekkehard Böhme, Hightstown, both of N.J.

[73] Assignee: E.R. Squibb & Sons, Inc., Princeton, N.J.

[22] Filed: June 7, 1972

[21] Appl. No.: 260,635

Related U.S. Application Data

[63] Continuation-in-part of Ser. No. 119,034, Feb. 25, 1971, abandoned.

[52] U.S. Cl. ............................. 260/243 C, 424/246
[51] Int. Cl. ............................................ C07d 99/24
[58] Field of Search ............................... 260/243 C

[56] References Cited
UNITED STATES PATENTS

| | | | |
|---|---|---|---|
| 3,647,781 | 3/1972 | Wieslogle | 260/239.1 |
| 3,709,880 | 1/1973 | Goegleman et al. | 260/239.1 |
| 3,718,644 | 2/1973 | Weston et al. | 260/239.1 |

*Primary Examiner*—Nicholas S. Rizzo
*Attorney, Agent, or Firm*—Lawrence S. Levinson; Merle J. Smith; Stephen B. Davis

[57] ABSTRACT

Disclosed herein are cephalosporanic acid and derivatives thereof which are substituted in the 7-position, processes for preparing such compounds and the utility thereof. The compounds of the invention have been found to be useful as antibacterial agents.

7 Claims, No Drawings

7-SUBSTITUTED CEPHALOSPORANIC ACID AND DERIVATIVES THEREOF

This application is a continuation-in-part of application Ser. No. 119,034, filed Feb. 25, 1971, now abandoned.

SUMMARY OF INVENTION

This invention relates to 7-substituted-7-aminocephalosporanic acid having the following Formula I:

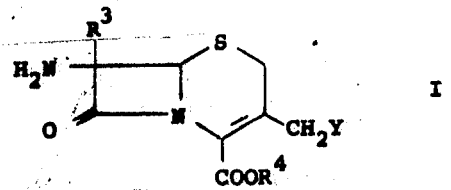

wherein $R^3$ is alkyl, aralkyl, alkylene alkyl, cycloalkyl or cycloalkylene and $R^4$ is hydrogen, lower alkyl, aralkyl, substituted alkyl, substituted aralkyl or cation; Y is hydrogen, acetoxy, pyridinium, alkoxy, alkyl, mercapto, hydroxy or alkylamino. These compounds have been found to be useful as antibacterial agents and as intermediates in the preparation of 7-acylamino-7-substituted cephalosporanic acids and pharmaceutically acceptable salts thereof.

DESCRIPTION OF INVENTION

This invention relates to novel 7-substituted-7-aminocephalosporanic acid and derivatives thereof which are active as antibacterial agents and are valuable intermediates utilized in the preparation of the acylated derivatives. The 7-substituted-7-aminocephalosporanic acids and salts of this invention also possess antibacterial activity which is enhanced by acylation of the 7-amino group. In Formula I above the term pharmaceutically acceptable cation means an alkali metal (e.g., sodium and potassium), an alkaline earth metal (e.g., calcium and magnesium), ammonium, or an amine, such as a lower alkyl amine (e.g., methylamine), a di(lower alkyl)amine (e.g., diethylamine), a phenyl-lower alkylamine (e.g., benzylamine), a di(phenyl-lower alkyl)amine (e.g., dibenzylamine), or an alkylenediamine (e.g., N,N'-dibenzylethylenediamine), or the like. In the case where Y=pyridinium or quarternary ammonium, $R^4$ is represented by an anion.

Compounds of Formula I are prepared by reacting a Schiff's base of 7-aminocephalosporanic acid of Formula II:

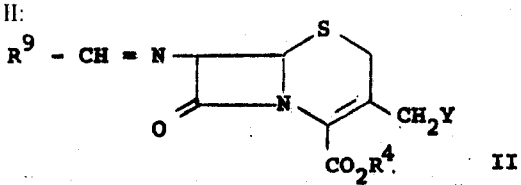

wherein $R^9$ is phenyl, X-substituted phenyl, lower alkyl or aralkyl (e.g., benzyl or phenethyl), wherein X is halogen (e.g., chloro, bromo), alkoxy, hydroxy, nitro, amine, or lower alkyl; with a compound having the Formula III:

wherein L is a leaving group such as halogen (e.g., chloro-, bromo-, and so forth), sulfonate, sulfate, methylsulfonyloxy, p-toluenesulfonyloxy, and $R^3$ and Y are as defined herein.

This reaction is conducted in the presence of a base, such as alkali metal hydroxide such as sodium hydroxide, triton-β, potassium t-butoxide, sodium methoxide, or triphenylmethyl sodium, sodium hydride, etc.

Compounds of Formula III that may be utilized in the practice of the invention are methyl sulfate, ethyl sulfate, methyl p-toluenesulfonate, propyliodide, allylchloride, benzylchloride, hexylchloride, 1,2-dichloropropene-2, butylbromide, methyl iodide and so forth.

It is to be understood that the term lower alkyl and lower alkoxy in the formulae of the instant invention include straight and branched chain radicals of from 1 to about 8 carbons such as methyl, ethyl, propyl, isopropyl, butyl, isobutyl, t-butyl, amyl, methoxy, ethoxy, propoxy, isopropoxy, and the like. Further, it will be appreciated that certain of the compounds of this invention exist in different optically active forms. The various stereoisomeric forms as well as the racemic compounds are within the scope of this invention.

The term aryl, such as in aryl, aryloxy, arylthio, etc. is intended to include phenyl, α- and β-naphthyl. In addition, the term aryl is intended to encompass mono and disubstituted-phenyl, or α- and β-napthyl groups wherein said substituents are halogen, hydroxy, amino, nitro and alkyl.

The term heterocyclyl, while intended to encompass the entire class, more specifically is intended to encompass the thiophene, isoxazole, oxadiazole, thiadiazole, pyridine, pyrazene, morpholine, quinoline, isoquinoline, tetrazole, furan, pyrrole and indole. The ring systems may be at various hydrogenated states, such as dihydrofuran and tetrahydrofuran. In addition, the point of linkage may be at any of the possible ring positions and the ring systems may carry additional substituents such as alkyl, alkoxy, amino, nitro, halogen, etc.

Suitable compounds of Formula II include any Schiff's base of 7-ADCA or 7-ACA (or a protected form thereof). When using this process, the preferred Schiff's bases are those formed with aldehydes which do not interfere with the alkylation reaction; such as nitro, chloro, alkoxy or alkylbenzaldehydes. Thus, although any of the Schiff's bases of 6-APA disclosed in Patent application Ser. No. 84,946 now abandoned can be used correspondingly with 7-ACA or 7-ADCA nuclei, the preferred are those of the formula: RCHO, wherein R is phenyl, p-methoxyphenyl, m-nitrophenyl, halophenyl (e.g., p-chlorophenyl, m-fluorophenyl and o-bromophenyl), (lower alkoxy)phenyl (e.g., o-methoxyphenyl), carbo(lower alkoxy)phenyl (e.g., p-carbomethoxyphenyl, o-carboethoxyphenyl, p-carbohexyloxyphenyl, and m-carbobutoxyphenyl), o-n-propoxyphenyl, and p-n-hexyloxyphenyl), di(lower alkyl) aminophenyl [e.g., p-dimethylaminophenyl, o-diethylaminophenyl, p-(N-n-butyl-N-methylamine)-phenyl, and m-di-n-pentylaminophenyl], naphthyl. The reaction in forming compounds of Formula II is preferably conducted in an inert organic solvent for the Schiff's base reactant, such as methylene chloride, benzene, dimethoxyethane, dioxane and chloroform.

Compounds of the Formula II can be used in either their salt form or in the form of an ester. Suitable salt forms include those with alkali metals (e.g., sodium and potassium), alkaline earth metals (e.g., calcium). Suitable esters include those formed with lower alkanols (e.g., methanol, ethanol and tert.-butanol), cycloalkanols (e.g., cyclohexanol and cyclopentanol), carbocyclic aryl alcohols (e.g., benzyl alcohol, benzhydrol, 1-naphthylmethyl alcohol and 2-phenylethanol), trimethylsilyl, lower alkanoyl(lower alkanols) (e.g., hydroxyacetone and pivaloylmethanol), carbocyclic aroyl(lower alkanols) (e.g., benzoylmethanol, 2-benzoylethanol and 2-naphthylcarbonylmethanol), cycloalkylcarbonyl(lower alkanols) (e.g., hydroxymethylcyclohexylketone), lower alkanoyloxy (lower alkanols) (e.g., pivaloyloxymethanol), and substituted derivatives of any of the above, such as lower alkyl (e.g., methyl and ethyl), lower alkoxy (e.g., methoxy and butoxy), halo (e.g., chloro, fluoro and bromo), and nitro derivatives, asa exemplified by 2,2,2-trichloroethanol, 2-bromoethanol, p-nitrophenol, p-methoxyphenol, p-methoxybenzyl alcohol, p,p'-dimethoxybenzhydrol, 2-dimethylamino ethanol, p-nitrobenzoylmethanol and p-methoxybenzoylmethanol.

The reaction of Compound II with Compound III yields a compound of Formula IV:

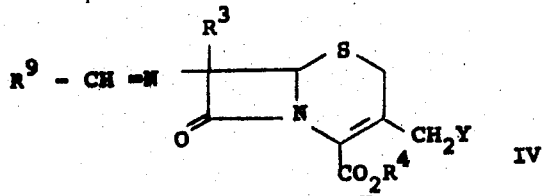

which can then be converted to compounds of Formula I by hydrolysis in the presence of a mild aqueous acid, such as hydrochloric, sulfuric, formic, trifluoroacetic and acetic acid to yield the 7-substituted-7-aminocephalosporanic acid of Formula I.

As stated above compounds of Formula I are valuable intermediates in the formation of acylated compounds having the Formula V:

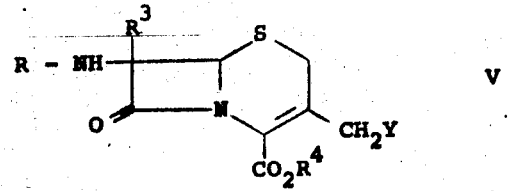

wherein Y, $R^3$ and $R^4$ are as defined herein and R is acyl. Acyl in this invention is defined as:

a. $R^2(CH_2)_nCO$— where $R^2$ is phenyl, nitrophenyl, chlorophenyl, bromophenyl, lower alkyl phenyl, lower alkoxy phenyl, cycloalkyl or heterocyclyl, and n is an integer from 0, 1 to 4, b. $R^5CO$— where $R^5$ contains from two to seven carbon atoms and is alkyl, alkylthioalkyl or alkoxyalkoxyalkyl, c. $R^6CO$— where $R^6$ contains from two to seven carbon atoms and is alkenyl, alkylthioalkenyl, alkenylthioalkyl, alkoxyalkenyl or alkenyloxyalkyl, d. $R^2X_1(CH_2)_nCO$— where $R^2$ and n are as defined above and $X_1$ is oxygen or sulphur, e. $R^2(CH_2)_nS(CH_2)_mCH_2CO$— where $R^2$ and n are as defined above and m is 0 or an integer from 1 to 4, f. $R^2CO$— where $R^2$ is as defined above, g. $R^7(CH_2)_nCO$— where $R^7$ is carbocyclic or substituted carbocyclic (e.g., lower alkyl dihydrocyclohexyl, lower alkoxy dihydrocyclohexyl such as 2,4-dimethyl-2,4-dihydrocyclohexyl, and 2-propoxy-2,4-dihydrocyclohexyl), aryl, heterocyclyl, aryloxy, arylthio, and alkyloxy and n is an integer from 0, 1 to 4, (h) 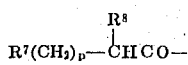

where $R^7$ is as defined herein, $R^8$ is alkyl, amino, ureido, carboxy, sulfonyl, phosphonyl, hydrogen, hydroxy, chloro, bromo, or iodo; p is an integer from 0, 1 to 3, and (i) 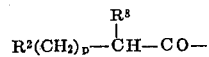

where $R^2$, $R^8$ and p are as defined above.

Compounds of general Formula V are prepared from compounds of general Formula I.

The formation of compounds of general Formula V may, for example, be effected by one of the following methods:

a. Reaction of the compound of general Formula I with an acid chloride, or acid anhydride, active ester, acid azide, etc. in aqueous or organic solution.

b. Reaction of the compound of general Formula I with a mixed anhydride of an acid corresponding to the desired acyl group and another acid, the mixed anhydride being formed by reaction of the acid corresponding to the desired acyl group with an alkyl haloformate, if desired formed in situ; the reaction with the mixed anhydride preferably being conducted in solution in an anhydrous, inert solvent in the presence of an acid binding agent e.g., a tertiary amine.

c. Reaction of the compound of Formula I with the activated form of a carboxylic acid formed by reaction with carbonyl-di-imidazole or dicyclohexylcarbodiimide or similar activating agent.

The compounds of this invention have a broad spectrum of antibiotic activity. They have antibacterial activity against microorganisms, such as *Staphylococcus aureus*, and *Streptococcus pyrogenes*. They may be used as antibacterial agents in a prophylactic manner, e.g., in cleaning or disinfecting compositions, or other wise to combat infections due to organisms such as those named above, and in general may be utilized in a manner similar to cephalothin, cephalexin, cephaloridine and other cephalosporins. For example, a compound of Formula I may be used in various animal species in an amount of about 0.1 to 100 mg/kg daily.

The following examples illustrate the invention (all temperatures being in degrees centigrade, unless otherwise stated):

EXAMPLE 1

N-Benzylidene-7-Aminodesacetoxycephalosporanic Acid, t-octylamine Salt 25 g 7-aminodesacetoxycephalosporanic acid is slurried in 2.5 liters water and neutralized over a period of 1–1½ hours to pH 7.5 with octylamine. The solution clarified and 12.1 ml. benzaldehyde is added over a period of one-half hour. After 2 hours agitation at room temperature, the solids are filtered and washed with 100 ml. water. The product is dried at 40°C overnight to give 43 grams of the desired product.

EXAMPLES 2–5

By following the procedure of Example 1 and substituting in place of the benzaldehyde an equivalent amount of:
o-nitrobenzaldehyde,
m-chlorobenzaldehyde, p-methoxybenzaldehyde, and
p-methylbenzaldehyde,
the products obtained are:
N-o-nitrobenzylidene-7-aminodesacetoxycephalosporanic acid, t-octylamine salt;
N-m-chlorobenzylidene-7-aminodesacetoxycephalosporanic acid, t-octylamine salt;
N-p-methoxybenzylidene-7-aminodesacetoxycephalosporanic acid, t-octylamine salt; and
N-p-methylbenzylidene-7-aminodesacetoxycephalosporanic acid, t-octylamine salt.

EXAMPLE 6

N-Benzylidene-7-Aminodesacetoxycephalosporanic Acid 73.8 Mmoles N-benzylidene-7-aminodesacetoxycephalosporanic acid, t-octylamine salt is added to 240 ml. methylene chloride cooled to 0°–5°C. (water bath). After dispersion 158.5 mmoles benzaldehyde are added, followed by the addition of an 8 ml. tetrahydrofuran solution containing 76.2 mmoles trifluoroacetic acid. During the course of this addition, the reaction mixture gradually clarifies to finally form a clear, slightly yellow solution. The reaction mixture is allowed to reach room temperature and concentrated to one-third its volume in vacuo at a temperature not exceeding 30°C. On cooling the desired product crystallized out in 76 mole %.

EXAMPLE 7

Benzyl ester of N-benzylidene-7-aminodesacetoxycephalosporanic acid

Treatment of a 0.1 molar solution of N-benzylidene-7-aminodesacetoxycephalosporanic acid with one equivalent of phenyl diazomethane in ether (Overberger and Anselme, J. ORG. CHEM., 28, 592 [1963]; Idem, J. AM. CHEM. SOC., 86, 658 [1964] for 1 hour, followed by evaporation deposits the product.

EXAMPLE 8

Diphenylmethyl ester of N-benzylidene-7-aminodesacetoxycephalosporanic acid

Substitution of one equivalent of diphenyldiazomethane for the solution of phenyl diazomethane in Example 7 gives the desired product.

EXAMPLE 9

Trichloroethyl ester of 7-benzaliminodesacetoxycephalosporanic acid

The Schiff base of Example 1 (10.0 g) is dissolved in 150 ml. of dichloromethane containing pyridine (5.2 g). Trichloroethanol 9.84 g is added followed by 6.79 g dicyclohexylcarbodiimide and the mixture stirred for 2 hours at room temperature. Precipitation of dicyclohexylurea occurs quickly. After 2 hours the precipitate is filtered off. The filtrate is diluted with dichloromethane and washed twice with an equal volume of water, first at pH 3.5, then at pH 7.2. It is then washed with saturated sodium chloride, dried over anhydrous magnesium sulfate, and stripped to dryness in vacuo. Wt. of yellow oil = 13.2 g.

The product is crystallized by dissolving it in 5 ml. of ether and adding hexane to the warm solution until slightly turbid upon cooling.

EXAMPLE 10 p-Methoxybenzyl ester of 7-benzaliminodesacetoxycephalosporanic acid

Substitution of 9.1 grams of p-methoxybenzyl alcohol for trichloroethanol in Example 9 leads to the desired product.

EXAMPLE 11

Methyl ester of 7-benzaliminodesacetoxycephalosporanic acid

By treating a dioxane solution of the product of Example 6 with excess ethereal diazomethane, followed by evaporation of the solvent, the desired product is obtained. Trituration with hexane gives a powder.

EXAMPLE 12

7-Benzalimino-7-methyldesacetoxycephalosporanic acid methyl ester 12.5 Meq. 7-benzaliminodesacetoxycepthalosporanic acid methyl ester are dissolved in 2 ml. dry DME under nitrogen at −5°C. Then a 20-fold excess methyl iodide is added along with 12.5 meq. sodium hydride. The reaction mixture turns yellow after a few minutes of stirring at that low temperature. After 3 hours, thin layer chromatography on Silica gel, showed no more starting material. The reaction mixture is diluted with chloroform, washed with water, dried over magnesium sulphate and evaporated in vacuo to give 4.8 grams of a brown oil. This was recrystallized from hexane-dichloromethane to give 5.8 meq. 7-benzalimino-7-$\alpha$-methyldesacetoxycephalosporanic acid, methyl ester; chromatography of the mother liquors on Silica gel led to the isolation of the 7-$\beta$-methyl epimer.

EXAMPLE 13

7-Benzalimino-7-methyldesacetoxycephalosporanic acid, p-methoxybenzyl ester

Substitution of 12.5 meq. of the p-methoxybenzyl ester of 7-benzaliminodesacetoxycephalosporanic acid in Example 12 for the methyl ester leads to the desired product.

EXAMPLE 14

7-Amino-7-methyl desacetoxycephalosporanic acid

Utilizing the solution of the benzaldehyde Schiff base (0.010 mole) of 6-APA in 50 ml. of dimethoxyethane is chilled to 0°C. under nitrogen; 0.020 mole of sodium hydride powder (mineral oil dispersion) is added, followed by 0.030 mole (excess) methyl iodide. The solution is rapidly stirred until hydrogen evolution is slowed or stops. Thin layer chromatography can be used to maintain disappearance of starting material and formation of the desired product. The reaction mixture is diluted with 100 ml. water and the pH adjusted to 2.5 (at 0°C). The result is filtered and extracted with 2 portions ether. The pH is readjusted to 4.5, and concentrated in vacuo if necessary, to precipitate the product.

b. 0.2 Mmole N-benzylidene-7-amino-7-methyl-desacetoxycephalosporanic acid, p-methoxybenzyl ester are dissolved in 6.5 ml. benzene and 4.33 mmoles anisole and 7.6 mmoles TFA are added. The reaction is allowed to proceed at room temperature for 6 hours. The whole is concentrated under vacuum. The residue is washed with 20 percent etther/petroleum ether to leave 7-methyl-7-aminodesacetoxycephalosporanic acid in 65% yield.

EXAMPLE 15

7-Benzalimino-7-methyldesacetoxycephalosporanic acid, benzyl ester

Substitution of 12.5 meq. of the benzyl ester of 7-benzaliminodesacetoxycephalosporanic acid in Example 12 for the methyl ester leads to the desired product.

EXAMPLE 16

7-Benzalimino-7-methyldesacetoxycephalosporanic acid, benzhydryl ester

By substituting 12.5 meq. of the benzhydryl ester for the methyl ester of Example 12 the desired product is obtained.

EXAMPLE 17

7-Amino-7-methyldesacetoxycephalosporanic acid, methyl ester 6.2 Meq. 7-benzalimino-7-methyldesacetoxycephalosporanic acid, methyl ester are hydrolyzed in a 50:50 mixture of acetone and 0.1 N aqueous hydrochloric acid for 10 minutes. The reaction mixture is then diluted with water and washed with chloroform. The acidic layer is then basified and extracted with chloroform. This latter chloroform layer is dried over magnesium sulphate and evaporated to dryness in vacuo. To give 5 meq. 7-amino-7-methyldesacetoxycephalosporanic acid, methyl ester.

EXAMPLE 18

7-Amino-7-methyldesacetoxycephalosporanic acid, p-methoxybenzyl ester

Substituting 6.2 meq. of the product of Example 13, and following the procedure of Example 17 the desired product is obtained.

EXAMPLE 19

7-Amino-7-methyldesacetoxycephalosporanic acid, benzyl ester

Substituting 6.2 meq. of the product of Example 15 for the substrate of Example 17 and following the procedure therein, the desired product is obtained.

EXAMPLE 20

7-Amino-7-methyldesacetoxycephalosporanic acid, benzhydryl ester

Substituting 6.2 meq. of the product of Example 16 for the substrate of Example 17 and following the procedure therein, the desired product is obtained.

EXAMPLE 21

7-Phenylacetamido-7-methyldesacetoxycephalosporanic acid, methyl ester 3.25 Meq. 7-amino-7-methyldesacetoxycephalosporanic acid, methyl ester are dissolved in 30 ml. chloroform, and cooled to ice-bath temperature under nitrogen. Then 3.25 meq. triethylamine are added followed by the addition of 3.25 meq. phenylacetylchloride. The reaction is allowed to proceed for two hours at ice-bath temperatures and under nitrogen. The solution is diluted with chloroform, washed with an aqueous solution at pH 7.2, washed with water, dried over magnesium sulphate, and evaporated to dryness to give 1.7 meq. of 7-phenylacetamido-7-methyldesacetoxycephalosporanic acid, methyl ester as a clear oil which crystallizes on standing.

EXAMPLE 22

7-Phenylacetamido-7-methyldesacetoxycephalosporanic acid, p-methoxybenzyl ester Substituting 3.25 meq. of 7-amino-7-methyldesacetoxycephalosporanic acid, p-methoxybenzyl ester in Example 21 for 7-amino-7-methyldesacetoxycephalosporanic acid, methyl ester, and following the procedure therein, the desired product was obtained.

EXAMPLE 23

7-Phenylacetamido-7-methyldesacetoxycephalosporanic acid a. By hydrolysis; 1 mmole of the 7-phenylacetamido-7-methyldesacetoxycephalosporanic acid, methyl ester in 10 ml. 95% ethanol is treated with 1 ml. of 1N NaOH at room temperature for 6 hours with stirring; the alcohol is evaporated at reduced pressure. The residue is dissolved in water and pH adjusted to 7.5 if necessary. The aqueous solution is washed with ethyl acetate, filtered and acidified to pH 4 at 0°C. to precipitate the product.

b. The product of Example 14 (obtained by using methyl iodide) as a solution with triethylamine in 1:1 water/acetone at 0°C. is treated with one equivalent of phenylacetyl chloride, with triethylamine being added to maintain pH at 6.5 to 7.5. When no further pH change is noted the reaction is worked up as in Example 23a to give the desired product.

c. A suspension of the t-octyl amine salt (0.1 mol.) of the benzaldehyde Schiff base of 7-ADCA in 100 ml of dimethoxyethane is treated with 10.8 g. of trimethyl silyl chloride at 10°C. for 2 hours. The reaction mix is filtered and 0.1 eq. of sodium hydride as a mineral oil dispersion is added followed immediately by 28 g. of methyl iodide. After 2 to 3 hours, the reaction mix is diluted with 250 ml. $H_2O$ and acidified to pH 2. After 20 minutes the result is filtered and the filtrate washed with ether. Adjusting the pH of the solution to 7 with triethylamine gives a solution of 7-methyl-7-ADCA which can be acylated with 0.10 mol. phenylacetyl chloride as in 23 to give the product.

d. By treatment of 7-phenylacetamido-7-methyldesacetoxycephalosporanic acid, p-methoxybenzyl ester in benzene with 2.1 mmoles anisole and 3.5 mmoles trifluoroacetic acid for 6 hours. The desired product is extracted from the acid solution in good yield.

EXAMPLE 24

7-Amino-7-benzyldesacetoxycephalosporanic acid

7-Amino-7-benzyldesacetoxycephalosporanic acid is prepared by using benzyl chloride in lieu of methyl iodide of Example 14.

EXAMPLE 25

7-Benzalimino-7-benzyldesacetoxycephalosporanic acid, methyl ester

7-Benzalimino-7-benzyldesacetoxycephalosporanic acid, methyl ester is prepared by the procedure of Example 12 but using an equivalent amount of benzyl chloride in place of methyl iodide.

EXAMPLE 26

7-Amino-7-benzyldesacetoxycephalosporanic acid, methyl ester

7-Amino-7-benzyldesacetoxycephalosporanic acid, methyl ester is prepared by using the product of Example 25 to replace the substrate 7-methyl compound of Example 17.

EXAMPLE 27

7-Phenylacetamido-7-benzyldesacetoxycephalosporanic acid, methyl ester

7-Phenylacetamido-7-benzyldesacetoxycephalosporanic acid, methyl ester is prepared by using the product of Example 26 for the substrate in Example 21.

EXAMPLE 28

7-Phenylacetamido-7-benzyldesacetoxycephalosporanic acid

7-Phenylacetamido-7-benzyldesacetoxycephalosporanic acid is prepared by the Example 23 substituting the corresponding benzyl compound for the methyl compounds.

EXAMPLES 29–51

By following the procedure of Example 23b and substituting an equivalent amount of the corresponding acid chloride of the following carboxylic acids:
  α-(2-chlorophenoxy)propionic acid,
  α-(4-sulfamylphenoxy)-n-butyric acid,
  α-(3,4-dimethoxyphenoxy)-n-pentanoic acid,
  α-(3-methylphenoxy)isovaleric acid,
  α-(4-methylthiophenoxy)propionic acid,
  α-(4-dimethylaminophenoxy)-n-hexanoic acid,
  α-(2-methoxyphenoxy)-n-decanoic acid,
  α-(2,4-dichlorophenoxy)phenylacetic acid,
  α-(2-nitrophenoxy)-β-phenylpropionic acid,
  α-(2-acetamidophenoxy)-γ-phenylbutyric acid,
  α-(2,4-dimethylphenoxy)-n-butyric acid,
  α-(4-isopropylphenoxy)propionic acid,
  α-(3-bromophenoxy)-n-butyric acid,
  α-(2-iodophenoxy)phenylacetic acid,
  α-(2-diethylaminophenoxy)isovaleric acid,
  α-(3,5-dichlorophenoxy)isohexanoic acid,
  α-(4-cyclohexylphenoxy)propionic acid,
  α-phenoxy-isovaleric acid,
  α-phenoxy-n-decanoic acid,
  α-phenoxy-γ-phenylbutyric acid,
  α-(2-benzylphenoxy)-n-butyric acid,
  α-(2-trifluoromethylphenoxy)propionic acid, and
  α-(4-fluorophenoxy)propionic acid,
the products obtained are
  7-[α-(2-chlorphenoxy)propionamido]-7-methyldesacetoxycephalosporanic acid,
  7-[α-(4-sulfamylphenoxy)-n-butyramido]-7-methyldesacetoxycephalosporanic acid,
  7-[α-(3,4-dimethoxyphenoxy)-n-pentanoamido]-7-methyldesacetoxycephalosporanic acid,
  7-[α-(3-methylphenoxy)isovaleramido]-7-methyldesacetoxycephalosporanic acid,
  7-[α-(4-methylthiophenoxy)propionamido]-7-methyldesacetoxycephalosporanic acid,
  7-[α-(4-dimemethylaminophenoxy)-n-hexanoamido]-7-methyldesacetoxycephalosporanic acid,
  7-[α-(2-methoxyphenoxy)-n-decanoamido]-7-methyldesacetoxycephalosporanic acid,
  7-[α-(2,4-dichlorophenoxy)phenylacetamido]-7-methyldesacetoxycephalosporanic acid,
  7-[α-(2-nitrophenoxy)-β-phenylpropionamido]-7-methyldesacetoxycepthalosporanic acid,
  7-[α-(2-acetamidophenoxy)-γ-phenylbutyramido]-7-methyldesacetoxycephalosporanic acid,
  7-[α-(2,4-dimethylphenoxy)-n-butyramido]-7-methyldesacetoxycephalosporanic acid,
  7-[α-(4-isopropylphenoxy)propionamido]-7-methyldesacetoxycephalosporanic acid,
  7-[α-(3-bromophenoxy)-n-butyramido]-7-methyldesacetoxycephalosporanic acid,
  7-[α-(2-iodophenoxy)phenylacetamido]-7-methyldesacetoxycephalosporanic acid,
  7-[α-(2-diethylaminophenoxy)isovaleramido]-7-methyldesacetoxycephalosporanic acid,
  7-[α-(3,5-dichlorophenoxy)isohexanoamido]-7-methyldesacetoxycephalosporanic acid,
  7-[α-(4-cyclohexylphenoxy)propionamido]-7-methyldesacetoxycephalosporanic acid,
  7-[α-phenoxy-isovaleramido]-7-methyldesacetoxycephalosporanic acid,
  7-[α-phenoxy-n-decanoamido]-7-methyldesacetoxycephalosporanic acid,
  7-[α-phenoxy-γ-phenylbutyramido]-7-methyldesacetoxycephalosporanic acid,
  7-[α-(2-benzylphenoxy)-n-butyramido]-7-methyldesacetoxycephalosporanic acid,
  7-[α-(2-trifluoromethylphenoxy)propionamido]-7-methyldesacetoxycephalosporanic acid, and
  7-[α-(4-fluorophenoxy)propionamido]-7-methyldesacetoxycephalosporanic acid, respectively.

EXAMPLES 52–81

By following the procedure of Example 23b and substituting an equivalent amount of the corresponding acid chloride of the following carboxylic acids
  α-phenylthiopropionic acid,
  α-paranitrophenylthiopropionic acid,
  α-parachlorophenylthiopropionic acid,
  α-phenylthiobutyric acid,
  α-phenylthiocaproic acid,
  α-phenylthioisovaleric acid,
  α-(4-t-butylphenylthio)propionic acid,
  α-ortho-tolythiopropionic acid,
  α-ortho-nitrophenylthiopropionic acid,
  α-parachlorophenylthiobutyric acid,
  α-(3,4,5-trichlorophenylthio)propionic acid,
  α-(3-trifluoromethylphenylthio)butyric acid,
  α-parabromophenylthioisovaleric acid,
  α-paraphenylphenylthiopropionic acid,
  α-(4-methoxyphenylthio)caproic acid,
  α-(4-cyclohexylphenylthio)butyric acid,
  α-phenylthio-α-cyclohexylacetic acid,
  α-phenylthio-α-cyclopentylacetic acid,
  α-(2,4-dichlorophenylthio)caproic acid,
  α-(2,4-diisoamylphenylthio)propionic acid,
  α-(4-benzylphenylthio)propionic acid,
  α-(4-sulfamylphenylthio)butyric acid,
  α-(2-allyloxyphenylthio)propionic acid,
  α-(4-allylphenylthio)isovaleric acid, α-(4-dimethylaminophenylthio)propionic acid,
α-(2,5-dichlorophenylthio)butyric acid,
α-(2-iodophenylthio)propionic acid,
α-(2-acetamidophenylthio)propionic acid,
α-(4-diethylaminophenylthio)propionic acid, and
α-(3-fluorophenylthio)butyric acid,
the products obtained are
 7-(α-phenylthiopropionamido)-7-methyldesacetoxycephalosporanic acid,
 7-(α-paranitrophenylthiopropionamido)-7-methyldesacetoxycephalosporanic acid,
 7-(α-parachlorophenylthiopropionamido)-7-methyldesacetoxycephalosporanic acid,
 7-(α-phenylthiobutyramido)-7-methyldesacetoxycephalosporanic acid,
 7-(α-phenylthiocaproamido)-7-methyldesacetoxycephalosporanic acid,
 7-(α-phenylthioisovaleramido)-7-methyldesacetoxycephalosporanic acid,
 7-[α-(4-t-butylphenylthio)propionamido]-7-methyldesacetoxycephalosporanic acid,
 7-[α-ortho-tolylthiopropionamido]-7-methyldesacetoxycephalosporanic acid,
 7-(α-ortho-nitrophenylthiopropionamido)-7-methyldesacetoxycephalosporanic acid,
 7-(α-parachlorophenylthiobutyramido)-7-methyldesacetoxycephalosporanic acid,
 7-[α-(3,4,5-trichlorophenylthio)propionamido]-7-methyldesacetoxycephalosporanic acid,
 7-[α-(3-trifluoromethylphenylthio)butyramido]-7-methyldesacetoxycephalosporanic acid,
 7-(α-parabromophenylthioisovaleramido)-7-methyldesacetoxycephalosporanic acid,
 7-(α-paraphenylphenylthiopropionamido)-7-methyldesacetoxycephalosporanic acid,
 7-[α-(4-methoxyphenylthio)caproamido]-7-methyldesacetoxycephalosporanic acid,
 7-[α-(4-cyclohexylphenylthio)butyramido]-7-methyldesacetoxycephalosporanic acid,
 7-(α-phenylthio-α-cyclohexylacetamido)-7-methyldesacetoxycephalosporanic acid,
 7-(α-phenylthio-α-cyclopentylacetamido)-7-methyldesacetoxycephalosporanic acid,
 7-[α-(2,4-dichlorophenylthio)caproamido]-7-methyldesacetoxycephalosporanic acid,
 7-[α-(2,4-diisoamylphenylthio)propionamido]-7-methyldesacetoxycephalosporanic acid,
 7-[α-(4-benzylphenylthio)propionamido]-7-methyldesacetoxycephalosporanic acid,
 7-[α-(4-sulfamylphenylthio)butyramido]-7-methyldesacetoxycephalosporanic acid,
 7-[α-(2-allyloxyphenylthio)propionamido]-7-methyldesacetoxycephalosporanic acid,
 7-[α-(4-allylphenylthio)isovaleramido]-7-methyldesacetoxycephalosporanic acid,
 7-[α-(4-dimethylaminophenylthio)propionamido]-7-methyldesacetoxycephalosporanic acid,
 7-[α-(2,5-dichlorophenylthio)butyramido]-7-methyldesacetoxycephalosporanic acid,
 7-[α-(2-iodophenylthio)propionamido]-7-methyldesacetoxycephalosporanic acid,
 7-[α-(2-acetamidophenylthio)propionamido]-7-methyldesacetoxycephalosporanic acid,
 7-[α-(4-diethylaminophenylthio)propionamido]-7-methyldesacetoxycephalosporanic acid, and
 7-[α-(3-fluorophenylthio)butyramido]-7-methyldesacetoxycephalosporanic acid, respectively.

EXAMPLES 82–95

By following the procedure of Example 23b and substituting an equivalent amount of the corresponding acid chloride of the following carboxylic acids
 D,L-α-amino-(3-thienyl)acetic acid,
 α-amino-(5-ethyl-2-thienyl)acetic acid,
 α-amino-(5-methyl-2-thienyl)acetic acid,
 α-amino-(5-t-butyl-2-thienyl)acetic acid,
 α-amino-(2,5-dimethyl-3-thienyl)acetic acid,
 α-amino-(5-chloro-2-thienyl)acetic acid,
 α-amino-(5-bromo-2-thienyl)acetic acid,
 α-amino-(5-phenyl-3-chloro-2-thienyl)acetic acid,
 α-amino-(3,5-dimethyl-2-thienyl)acetic acid,
 α-amino-(5-cyclohexyl-2-thienyl)acetic acid,
 α-amino-(5-diethylamino-2-thienyl)acetic acid,
 α-amino-(4-methylsulfonyl-2-thienyl)acetic acid,
 α-amino-(3-ethylthio-2-thienyl)acetic acid, and
 α-amino-(4-cycloheptyloxy-2-thienyl)acetic acid,
the products obtained are
 D,L-7-[α-amino-(3-thienyl)acetamido]-7-methyldesacetoxycephalosporanic acid,
 7-[α-amino-(5-ethyl-2-thienyl)acetamido]-7-methyldesacetoxycephalosporanic acid,
 7-[α-amino-(5-methyl-2-thienyl)acetamido]-7-methyldesacetoxycephalosporanic acid,
 7-[α-amino-(5-t-butyl)-2-thienyl)acetamido-7-methyldesacetoxycephalosporanic acid,
 7-[α-amino-(2,5-dimethyl-3-thienyl)acetamido]-7-methyldesacetoxycephalosporanic acid,
 7-[α-amino-(5-chloro-2-thienyl)acetamido]-7-methyldesacetoxycephalosporanic acid,
 7-[α-amino-(5-bromo-2-thienyl)acetamido]-7-methyldesacetoxycephalosporanic acid,
 7-[α-amino-(5-phenyl-3-chloro-2-thienyl)acetamido]-7-methyldesacetoxycephalosporanic acid,
 7-[α-amino-(3,5-dimethyl-2-thienyl)acetamido]-7-methyldesacetoxycephalosporanic acid,
 7-[α-amino-(5-cyclohexyl-2-thienyl)acetamido]-7-methyldesacetoxycephalosporanic acid,
 7-[α-amino-(5-diethylamino-2-thienyl)acetamido]-7-methyldesacetoxycephalosporanic acid,
 7-[α-amino-(4-methylsulfonyl-2-thienyl)acetamido]-7-methyldesacetoxycephalosporanic acid,
 7-[α-amino-(3-ethylthio-2-thienyl)acetamido]-7-methyldesacetoxycephalosporanic acid,
 7-[α-amino-(4-cycloheptyloxy-2-thienyl)acetamido]-7-methyldesacetoxycephalosporanic acid, respectively.

EXAMPLES 96–118

By following the procedure of Example 23b and substituting an equivalent amount of the corresponding acid chloride of the following carboxylic acids
 α-amino-p-chlorophenylacetic acid,
 α-amino-p-methoxyphenylacetic acid,
 α-aminophenylacetic acid,
 α-amino-4-diethylaminophenylacetic acid,
 α-amino-4-trifluoromethylphenylacetic acid,
 α-amino-2,4-dibromophenylacetic acid,
 α-amino-2-nitrophenylacetic acid,
 α-amino-3-methylphenylacetic acid,
 α-amino-4-sulfamylphenylacetic acid, α-amino-2-iodophenylacetic acid,
α-amino-4-t-butylphenylacetic acid,
α-amino-2-acetamidophenylacetic acid,
α-amino-3-nitrophenylacetic acid,
α-amino-3,4-dimethoxyphenylacetic acid,
α-amino-4-dimethylaminophenylacetic acid,
α-amino-2,4-dichlorophenylacetic acid,
α-amino-4-isopropylphenylacetic acid,
α-amino-3-bromophenylacetic acid,
α-amino-3-iodophenylacetic acid,
α-amino-2-diethylaminophenylacetic acid,
α-amino-2-trifluoromethylphenylacetic acid,
α-amino-4-fluorophenylacetic acid, and
α-amino-3,4,5-trifluoromethylphenylacetic acid,
the products obtained are
7-(α-amino-p-chlorophenylacetamido)-7-methyldesacetoxycephalosporanic acid,
7-(α-amino-p-methoxyphenylacetamido)-7-methyldesacetoxycephalosporanic acid,
7-α-aminophenyl-acetamido-7-methyldesacetoxycephalosporanic acid,
7-(α-amino-4-diethylaminophenylacetamido)-7-methyldesacetoxycephalosporanic acid,
7-(α-amino-4-trifluoromethylphenylacetamido)-7-methyldesacetoxycephalosporanic acid,
7-(α-amino-2,4-dibromophenylacetamido)-7-methyldesacetoxycephalosporanic acid,
7-(α-amino-2-nitrophenylacetamido)-7-methyldesacetoxycephalosporanic acid,
7-(α-amino-3-methylphenylacetamido)-7-methyldesacetoxycephalosporanic acid,
7-(α-amino-4-sulfamylphenylacetamido)-7-methyldesacetoxycephalosporanic acid,
7-(α-amino-2-iodophenylacetamido)-7-methyldesacetoxycephalosporanic acid,
7-(α-amino-4-t-butylphenylacetamido)-7-methyldesacetoxycephalosporanic acid,
7-(α-amino-2-acetamidophenylacetamido)-7-methyldesacetoxycephalosporanic acid,
7-(α-amino-3-nitrophenylacetamido)-7-methyldesacetoxycephalosporanic acid,
7-(α-amino-3,4-dimethoxyphenylacetamido)-7-methyldesacetoxycephalosporanic acid,
7-(α-amino-4-dimethylaminophenylacetamido)-7-methyldesacetoxycephalosporanic acid,
7-(α-amino-2,4-dichlorophenylacetamido)-7-methyldesacetoxycephalosporanic acid,
7-(α-amino-4-isopropylphenylacetamido)-7-methyldesacetoxycephalosporanic acid,
7-(α-amino-3-bromophenylacetamido)-7-methyldesacetoxycephalosporanic acid,
7-(α-amino-3-iodophenylacetamido)-7-methyldesacetoxycephalosporanic acid,
7-(α-amino-2-diethylaminophenylacetamido)-7-methyldesacetoxycephalosporanic acid,
7-(α-amino-2-trifluoromethylphenylacetamido)-7-methyldesacetoxycephalosporanic acid,
7-(α-amino-4-fluorophenylacetamido)-7-methyldesacetoxycephalosporanic acid, and
7-(α-amino-3,4,5-trifluoromethylphenylacetamido)-7-methyldesacetoxycephalosporanic acid, respectivley.

EXAMPLES 119–189

By following the procedure of Example 23b and substituting an equivalent amount of the corresponding acid chloride:

benzyl chloride,
3,5-dinitrobenzoyl chloride,
2-chlorobenzoyl chloride,
2-methylbenzoyl chloride,
4-aminobenzoyl chloride,
4-nitrobenzoyl chloride,
4-hydroxybenzoyl chloride,
3,4,5-trimethoxybenzoyl chloride,
4-methylbenzoyl chloride,
4-chlorobenzoyl chloride,
3,4-dichlorobenzoyl chloride,
3-nitrobenzoyl chloride,
2,4,6-trimethoxybenzoyl chloride,
2-hydroxybenzoyl chloride,
4-ethoxybenzoyl chloride,
2,6-dimethoxybenzoyl chloride,
2,4,6-trimethylbenzoyl chloride,
2,6-dichlorobenzoyl chloride,
2,6-diethoxybenzoyl chloride,
2,6-di-n-butoxybenzoyl chloride,
2,6-dibenzyloxybenzoyl chloride,
2,3,6-trimethoxybenzoyl chloride,
2,4,6-tribromobenzoyl chloride,
2,6-di-n-propoxybenzoyl chloride,
2,6-dimethoxy-4-methylbenzoyl chloride,
4,6-diethyl-2-methoxybenzoyl chloride,
6-ethoxy-2-methoxybenzoyl chloride,
2-methylthiobenzoyl chloride,
2-benzylthiobenzoyl chloride,
2-phenoxybenzoyl chloride,
2-phenylbenzoyl chloride,
2-methoxybenzoyl chloride,
4-sulfamylbenzoyl chloride,
3,4-dimethoxybenzoyl chloride,
4-methoxybenzoyl chloride,
3-methylbenzoyl chloride,
3-dimethylaminobenzoyl chloride,
2-methoxybenzoyl chloride,
2-chloro-3,4,5-trimethoxybenzoyl chloride,
2,4-dichlorobenzoyl chloride,
2-nitrobenzoyl chloride,
4-methylaminobenzoyl chloride,
2-acetamidobenzoyl chloride,
2,4-dimethylbenzoyl chloride,
2,4,5-trimethylbenzoyl chloride,
4-isopropylbenzoyl chloride,
3-bromobenzoyl chloride,
2-iodobenzoyl chloride,
2-ethylaminobenzoyl chloride,
2,5-dihydroxybenzoyl chloride,
4-hydroxy-3-methoxybenzoyl chloride, 4-allylbenzoyl chloride,
4-allyloxybenzoyl chloride,
2-trifluoromethylbenzoyl chloride,
4-fluorobenzoyl chloride
2-phenylthiobenzoyl chloride,
2-benzylbenzoyl chloride,
2,6-dihydroxybenzoyl chloride,
2,6-diacetoxybenzoyl chloride,
2,6-dimethylthiobenzoyl chloride,
2,4,6-trinitrobenzoyl chloride,
2,6-diacetamidobenzoyl chloride,
2,6-dibromobenzoyl chloride,
2,6-dimethylbenzoyl chloride,
2,6-diethylbenzoyl chloride,
2,6-diisopropylbenzoyl chloride,
2,6-diallyloxybenzoyl chloride, 3-bromo-2,6-dimethoxybenzoyl chloride,
4-chloro-2,6-dimethoxybenzoyl chloride,
2-chloro-6-nitrobenzoyl chloride, and
2-hydroxy-6-methoxybenzoyl chloride,
the products obtained are
  7-(benzamido)-7-methyldesacetoxycephalosporanic acid,
  7-(3,5-dinitrobenzamido)-7-methyldesacetoxycephalosporanic acid,
  7-(2-chlorobenzamido)-7-methyldesacetoxycephalosporanic acid,
  7-(2-methylbenzamido)-7-methyldesacetoxycephalosporanic acid,
  7-(4-aminobenzamido)-7-methyldesacetoxycephalosporanic acid,
  7-(4-nitrobenzamido)-7-methyldesacetoxycephalosporanic acid,
  7-(4-hydroxybenzamido)-7-methyldesacetoxycephalosporanic acid,
  7-(3,4,5-trimethoxybenzamido)-7-methyldesacetoxycephalosporanic acid,
  7-(4-methylbenzamido)-7-methyldesacetoxycephalosporanic acid,
  7-(4-chlorobenzamido)-7-methyldesacetoxycephalosporanic acid,
  7-(3,4-dichlorobenzamido)-7-methyldesacetoxycephalosporanic acid,
  7-(3-nitrobenzamido)-7-methyldesacetoxycephalosporanic acid,
  7-(2,4,6-trimethoxybenzamido)-7-methyldesacetoxycephalosporanic acid,
  7-(2-hydroxybenzamido)-7-methyldesacetoxycephalosporanic acid,
  7-(4-ethoxybenzamido)-7-methyldesacetoxycephalosporanic acid,
  7-(2,6-dimethoxybenzamido)-7-methyldesacetoxycephalosporanic acid,
  7-(2,4,6-trimethylbenzamido)-7-methyldesacetoxycephalosporanic acid,
  7-(2,6-dichlorobenzamido)-7-methyldesacetoxycephalosporanic acid,
  7-(2,6-diethoxybenzamido)-7-methyldesacetoxycephalosporanic acid,
  7-(2,6-di-n-butoxybenzamido)-7-methyldesacetoxycephalosporanic acid,
  7-(2,6-dibenzyloxybenzamido)-7-methyldesacetoxycephalosporanic acid,
  7-(2,3,6-trimethoxybenzamido)-7-methyldesacetoxycephalosporanic acid,
  7-(2,4,6-tribromobenzamido)-7-methyldesacetoxycephalosporanic acid,
  7-(2,6-di-n-propoxybenzamido)-7-methyldesacetoxycephalosporanic acid,
  7-(2,6-dimethoxy-4-methylbenzamido)-7-methyldesacetoxycephalosporanic acid,
  7-(4,6-diethyl-2-methoxybenzamido)-7-methyldesacetoxycephalosporanic acid,
  7-(6-ethoxy-2-methoxybenzamido)-7-methyldesacetoxycephalosporanic acid,
  7-(2-methylthiobenzamido)-7-methyldesacetoxycephalosporanic acid,
  7-(2-benzylthiobenzamido)-7-methyldesacetoxycephalosporanic acid,
  7-(2-phenoxybenzamido)-7-methyldesacetoxycephalosporanic acid,
  7-(2-phenylbenzamido)-7-methyldesacetoxycephalosporanic acid,
  7-(2-methoxybenzamido)-7-methyldesacetoxycephalosporanic acid,
  7-(4-sulfamylbenzamide)-7-methyldesacetoxycephalosporanic acid,
  7-(3,4-dimethoxybenzamido)-7-methyldesacetoxycephalosporanic acid,
  7-(4-methoxybenzamido)-7-methyldesacetoxycephalosporanic acid,
  7-(3-methylbenzamido)-7-methyldesacetoxycephalosporanic acid,
  7-(3-dimethylaminobenzamido)-7-methyldesacetoxycephalosporanic acid,
  7-(2-methoxybenzamido)-7-methyldesacetoxycephalosporanic acid,
  7-(2-chloro-3,4,5-trimethoxybenzamido)-7-methyldesacetoxycephalosporanic acid,
  7-(2,4-dichlorobenzamido)-7-methyldesacetoxycephalosporanic acid,
  7-(2-nitrobenzamido)-7-methyldesacetoxycephalosporanic acid,
  7-(4-methylaminobenzamido)-7-methyldesacetoxycephalosporanic acid,
  7-(2-acetamidobenzamido)-7-methyldesacetoxycephalosporanic acid,
  7-(2,4-dimethylbenzamido)-7-methyldesacetoxycephalosporanic acid,
  7-(2,4,5-trimethylbenzamido)-7-methyldesacetoxycephalosporanic acid,
  7-(4-isopropylbenzamido)-7-methyldesacetoxycephalosporanic acid,
  7-(3-bromobenzamido)-7-methyldesacetoxycephalosporanic acid,
  7-(2-iodobenzamido)-7-methyldesacetoxycephalosporanic acid,
  7-(2-ethylaminobenzamido)-7-methyldesacetoxycephalosporanic acid,
  7-(2,5-dihydroxybenzamido)-7-methyldesacetoxycephalosporanic acid,
  7-(4-hydroxy-3-methoxybenzamido)-7-methyldesacetoxycephalosporanic acid,
  7-(4-allylbenzamido)-7-methyldesacetoxycephalosporanic acid,
  7-(4-allyloxybenzamido)-7-methyldesacetoxycephalosporanic acid,
  7-(2-trifluoromethylbenzamido)-7-methyldesacetoxycephalosporanic acid,
  7-(4-fluorobenzamido)-7-methyldesacetoxycephalosporanic acid,
  7-(2-phenylthiobenzamido)-7-methyldesacetoxycephalosporanic acid,
  7-(2-benzylbenzamido)-7-methyldesacetoxycephalosporanic acid,
  7-(2,6-dihydroxybenzamido)-7-methyldesacetoxycephalosporanic acid,
  7-(2,6-diacetoxybenzamido)-7-methyldesacetoxycephalosporanic acid,
  7-(2,6-dimethylthiobenzamido)-7-methyldesacetoxycephalosporanic acid,
  7-(2,4,6-trinitrobenzamido)-7-methyldesacetoxycephalosporanic acid,
  7-(2,6-diacetamidobenzamido)-7-methyldesacetoxycephalosporanic acid,
  7-(2,6-dibromobenzamido)-7-methyldesacetoxycephalosporanic acid,
  7-(2,6-dimethylbenzamido)-7-methyldesacetoxycephalosporanic acid, 7-(2,6-diethylbenzamido)-7-methyldesacetoxycephalosporanic acid,
7-(2,6-diisopropylbenzamido)-7-methyldesacetoxycephalosporanic acid,
7-(2,6-diallyloxybenzamido)-7-methyldesacetoxycephalosporanic acid,
7-(3-bromo-2,6-dimethoxybenzamido)-7-methyldesacetoxycephalosporanic acid,
7-(4-chloro-2,6-dimethoxybenzamido)-7-methyldesacetoxycephalosporanic acid,
7-(2-chloro-6-nitrobenzamido)-7-methyldesacetoxycephalosporanic acid, and
7-(2-hydroxy-6-methoxybenzamido)-7-methyldesacetoxycephalosporanic acid, respectively.

EXAMPLES 190–200

By following the procedure of Example 23b and substituting an equivalent amount of the corresponding acid chloride:
(4-nitrophenyl)acetyl chloride,
(4-bromophenyl)acetyl chloride,
(4-t-butylphenyl)acetyl chloride,
(4-trifluoromethylphenyl)acetyl chloride,
(3-fluorophenyl)acetyl chloride,
(4-sulfamylphenyl)acetyl chloride,
(2-benzylphenyl)acetyl chloride,
(3-methoxyphenyl)acetyl chloride,
(2iodophenyl)acetyl chloride,
(3-diethylaminophenyl)acetyl chloride, and
(2,4-diisoamylphenyl)acetyl chloride,
the products obtained are
7-[α-(4-nitrophenyl)acetamido]-7-methyldesacetoxycephalosporanic acid,
7-[α-(4-bromophenyl)acetamido]-7-methyldesacetoxycephalosporanic acid,
7-[α-(4-t-butylphenyl)acetamido]-7-methyldesacetoxycephalosporanic acid,
7-[α-(4-trifluoromethylphenyl)acetamido]-7-methyldesacetoxycephalosporanic acid,
7-[α-(3-fluorophenyl)acetamido]-7-methyldesacetoxycephalosporanic acid,
7-[α-(4-sulfamylphenyl)acetamido]-7-methyldesacetoxycephalosporanic acid,
7-[α-(2-benzylphenyl)acetamido]-7-methyldesacetoxycephalosporanic acid,
7-[α-(3-methoxyphenyl)acetamido]-7-methyldesacetoxycephalosporanic acid,
7-[α-(2-iodophenyl)acetamido]-7-methyldesacetoxycephalosporanic acid,
7-[α-(3-diethylaminophenyl)acetamido]-7-methyldesacetoxycephalosporanic acid, and
7-[α-(2,4-diisoamylphenyl)acetamido]-7-methyldesacetoxycephalosporanic acid, respectively.

EXAMPLES 201–248

By following the procedure of Example 23b and substituting an equivalent amount of the corresponding acid chloride:
3-m-chlorophenyl-5-methyl-4-isoxazole-4-carbonyl chloride,
3-(2,4-dichlorophenyl)-5-methyl-4-isoxazole-4-carbonyl chloride,
3-(3,4-dichlorophenyl)-5-methyl-4-isoxazole-4-carbonyl chloride,
3-p-tolyl-5-methyl-4-isoxazole-4-carbonyl chloride,
3-o-nitrophenyl-5-methyl-4-isoxazole-4-carbonyl chloride,
3-m-nitrophenyl-5-methyl-4-isoxazole-4-carbonyl chloride,
3-p-nitrophenyl-5-methyl-4-isoxazole-4-carbonyl chloride,
3-p-bromophenyl-5-methyl-4-isoxazole-4-carbonyl chloride,
3-p-fluorophenyl-5-methyl-4-isoxazole-4-carbonyl chloride,
3-p-methylsulfonylphenyl-5-methyl-4-isoxazole-4-carbonyl chloride,
3-p-methoxyphenyl-5-methyl-4-isoxazole-4-carbonyl chloride,
3-p-trifluoromethylphenyl-5-methyl-4-isoxazole-4-carbonyl chloride,
3-o-methoxyphenyl-5-methyl-4-isoxazole-4-carbonyl chloride,
3-p-ethoxyphenyl-5-methyl-4-isoxazole-4-carbonyl chloride,
3-(3,4-dimethoxyphenyl)-5-methyl-4-isoxazole-4-carbonyl chloride,
3-p-dimethylaminophenyl-5-methyl-4-isoxazole-4-carbonyl chloride,
3-α-naphthyl-5-methyl-4-isoxazole-4-carbonyl chloride,
3-β-naphthyl-5-methyl-4-isoxazole-4-carbonyl chloride,
3-phenyl-5-ethyl-4-isoxazole-4-carbonyl chloride,
3-p-chlorophenyl-5-ethyl-4-isoxazole-4-carbonyl chloride,
3-phenyl-5-isopropyl-4-isoxazole-4-carbonyl chloride,
3-phenyl-5-methylmercapto-4-isoxazole-4-carbonyl chloride,
3-methyl-5-o-chlorophenyl-4-isoxazole-4-carbonyl chloride,
3-methyl-5-p-bromophenyl-4-isoxazole-4-carbonyl chloride,
3-methyl-5-o-iodophenyl-4-isoxazole-4-carbonyl chloride,
3-methyl-5-(2,4-dichlorophenyl)-4-isoxazole-4-carbonyl chloride,
3-methyl-5-m-nitrophenyl-4-isoxazole-4-carbonyl chloride,
3-methyl-5-p-tolyl-4-isoxazole-4-carbonyl chloride,
3-methyl-5-p-nitrophenyl-4-isoxazole-4-carbonyl chloride,
3-methyl-5p-methoxyphenyl-4-isoxazole-4-carbonyl chloride,
3-methyl-5-p-ethoxyphenyl-4-isoxazole-4-carbonyl chloride,
3-methyl-5-(2,6-dimethoxyphenyl)-4-isoxazole-4-carbonyl chloride,
3-methyl-5-p-methylsulfonylphenyl-4-isoxazole-4-carbonyl chloride,
3-methyl-5-p-fluorophenyl-4-isoxozole-4-carbonyl chloride,
3-methyl-5-p-cyanophenyl-4-isoxazole-4-carbonyl chloride,
3-methyl-5-p-methylmercaptophenyl-4-isoxazole-4-carbonyl chloride,
3-methyl-5-p-dimethylaminophenyl-4-isoxazole-4-carbonyl chloride,
3-methyl-5-α-naphthyl-4-isoxazole-4-carbonyl chloride, 3-methyl-5-α-naphthyl-4-isoxazole-4-carbonyl chloride,
3-ethyl-5-phenyl-4-isoxazole-4-carbonyl chloride,
3-ethyl-5-p-chlorophenyl-4-isoxazole-4-carbonyl chloride,
3-isopropyl-5-phenyl-4-isoxazole-4-carbonyl chloride,
3-tert. butyl-5-methyl-4-isoxazole-4-carbonyl chloride,
3-methyl-5-p-trifluoromethylphenyl-4-isoxazole-4-carbonyl chloride,
3-methyl-5-cyclohexyl-4-isoxazole-4-carbonyl chloride,
3-cyclohexyl-5-methyl-4-isoxazole-4-carbonyl chloride,
3-α-furyl-5-methyl-4-isoxazole-4-carbonyl chloride, and
3-α-thienyl-5-methyl-4-isoxazole-4-carbonyl chloride,
the products obtained are
7-[3-m-chlorophenyl-5-methyl-4-isoxazolylcarbonylamino]-7-methyldesacetoxy cephalosporanic acid,
7-[3-(2,4-dichlorophenyl)-5-methyl-4-isoxazolylcarbonylamino]-7-methyldesacetoxycephalosporanic acid,
7-[3-(3,4-dichlorophenyl)-5-methyl-4-isoxazolylcarbonylamino -7- methyldesacetoxycephalosporanic acid,
7-[3-p-tolyl-5-methyl-4isoxazolylcarbonylamino]-7-methyldesacetoxycephalosporanic acid,
7-[3-o-nitrophenyl-5-methyl-4-isoxazolylcarbonylamino]-7-methyldesacetoxycephalosporanic acid,
7-[3-m-nitrophenyl-5-methyl-4-isoxazolylcarbonylamino]-7-methyldesacetoxycephalosporanic acid,
7-[3-p-nitrophenyl-5-methyl-4-isoxazolylcarbonylamino]-7-methyldesacetoxycephalosporanic acid,
7-[3-p-bromophenyl-5-methyl-4-isoxazolylcarbonylamino]-7-methyldesacetoxycephalosporanic acid,
7-[3-p-fluorophenyl-5-methyl-4-isoxazolylcarbonylamino]-7-methyldesacetoxycephalosporanic acid,
7-[3-p-methylsulfonylphenyl-5-methyl-4-isoxazolylcarbonylamino]-7-methyldesacetoxycephalosporanic acid,
7-[3-p-methoxyphenyl-5-methyl-4-isoxazolylcarbonylamino]-7-methyldesacetoxycephalosporanic acid,
7-[3-p-trifluoromethylphenyl-5-methyl-4-isoxazolylcarbonylamino]-7-methyldesacetoxycephalosporanic acid,
7-[3-o-methoxyphenyl-5-methyl-4-isoxazolylcarbonylamino]-7-methyldesacetoxycephalosporanic acid,
7-[3-p-ethoxyphenyl-5-methyl-4-isoxazolylcarbonylamino]-7-methyldesacetoxycephalosporanic acid,
7-[3-(3,4-dimethoxyphenyl)-5-methyl-4-isoazolylcarbonylamino]-7-methyldesacetoxycephalosporanic acid,
7-[3-p-dimethylaminophenyl-5-methyl-4-isoxazolylcarbonylamino]-7-methyldesacetoxycephalosporanic acid,
7-[3-α-naphthyl-5-methyl-4-isoxazolylcarbonylamino]-7-methyldesacetoxycephalosporanic acid,
7-[3-β-naphthyl-5-methyl-4-isoxazolylcarbonylamino]-7-methyldesacetoxycephalosporanic acid,
7-[3-phenyl-5-ethyl-4-isoxazolylcarbonylamino]-7-methyldesacetoxycephalosporanic acid,
7-[3-p-chlorophenyl-5-ethyl-4-isoxazolylcarbonylamino]-7-methyldesacetoxycephalosporanic acid,
7-[3phenyl-5-isopropyl-4-isoxazolylcarbonylamino]-7-methyldesacetoxycephalosporanic acid,
7-[3-phenyl-5-methylmercapto-4-isoxazolylcarbonylamino]-7-methyldesacetoxycephalosporanic acid,
7-[3-methyl-5-o-chlorophenyl-4-isoxazolylcarbonlamino]-7-methyldesacetoxycephalosporanic acid,
7-[3-methyl-5-p-bromophenyl-4-isoxazolylcarbonylamino]-7-methyldesacetoxycephalosporanic acid,
7-[3-methyl-5-o-iodophenyl-4-isoxazolylcarbonylamino]-7-methyldesacetoxycephalosporanic acid,
7-[3-methyl-5-(2,4-dichlorophenyl)-4-isoxazolylcarbonylamino]-7-methyldesacetoxycephalosporanic acid,
7-[3-methyl-5-m-nitrophenyl-4-isoxazolylcarbonylamino]-7-methyldesacetoxycephalosporanic acid,
7-[3-methyl-5-p-tolyl-4-isoxazolylcarbonylamino]-7-methyldesacetoxycephalosporanic acid,
7-[3-methyl-5-p-nitrophenyl-4-isoxazolylcarbonylamino]-7-methyldesacetoxycephalosporanic acid,
7-[3-methyl-5-p-methoxyphenyl-4-isoxazolycarbonylamino]-7-methyldesacetoxycephalosporanic acid,
7-[3-methyl-5-p-ethoxyphenyl-4-isoxazolylcarbonyl]-7-methyldesacetoxycephalosporanic acid,
7-[3-methyl-5-(2,6-dimethoxyphenyl)-4-isoxazolylcarbonylamino]-7-methyldesacetoxycephalosporanic acid,
7-[3-methyl-5-p-methylsulfonylphenyl-4-isoxazolylcarbonylamino]-7-methyldesacetoxycephalosporanic acid,
7-[3-methyl-5-p-fluorophenyl-4-isoxazolycarbonylamino]-7-methyldesacetoxycephalosporanic acid,
7-[3-methyl-5-p-cyanophenyl-4-isoxazolylcarbonylamino]-7-methyldesacetoxycephalosporanic acid,
7-[3-methyl-5-p-methylmercaptophenyl-4-isoxazolylcarbonylamino]-7-methyldesacetoxycephalosporanic acid,
7-[3-methyl-5-p-dimethylaminophenyl-4-isoxazolylcarbonylamino]-7-methyldesacetoxycephalosporanic acid,
7-[3-methyl-5-α-naphthyl-4-isoxazolylcarbonylamino]-7-methyldesacetoxycephalosporanic acid, 7-[3-methyl-5-β-naphthyl-4-isoxazolylcarbonylamino]-7-methyldesacetoxycephalosporanic acid,
7-[3-ethyl-5-phenyl-4-isoxazolylcarbonylamino]-7-methyldesacetoxycephalosporanic acid,
7-[3-ethyl-5p-chlorophenyl-4-isoxazolylcarbonylamino]-7-methyldesacetoxycephalosporanic acid,
7-[3-isopropyl-5-phenyl-4-isoxazolylcarbonylamino]-7-methyldesacetoxycephalosporanic acid,
7-[3-tert. butyl-5-methyl-4-isoxazolylcarbonylamino[-7-methyldesacetoxycephalosporanic acid,
7-[3-methyl-5-p-trifluoromethylphenyl-4-isoxazolylcarbonlyamino]-7-methyldesacetoxycephalosporanic acid,
7-[3-methyl-5-cyclohexyl-4-isoxazolylcarbonylamino]-7-methyldesacetoxycephalosporanic acid,
7-[3-cyclohexyl-5-methyl-4-isoxazolylcarbonylamino]-7-methyldesacetoxycephalosporanic acid,
7-[3-α-furyl-5-methyl-4-isoxazolylcarbonylamino]-7-methyldesacetoxycephalosporanic acid, and
7-[3-α-thienyl-5-methyl-4-isoxazolylcarbonylamino]-7-methyldesacetoxycephalosporanic acid, respectively.

EXAMPLES 249–263

By following the procedure of Example 23b and substituting an equivalent amount of the corresponding acid chloride:
3,5-diphenyl-4-isoxazole-4-carbonyl chloride,
3-methyl-5-phenyl-4-isoxazole-4-carbonyl chloride,
3,5-dimethyl-4-isoxazole-4-carbonyl chloride,
5-benzyl-3-methyl-4-isoxazole-4-carbonyl chloride,
3-methyl-5-styryl-4-isoxazole-4-carbonyl chloride,
5-tert. butyl-3-phenyl-4-isoxazole-4-carbonyl chloride,
5-(2-furyl)-3-methyl-4-isoxazole-4-carbonyl chloride,
3-methyl-5-(3',5'-dimethyl-40'-isoxazolyl)-4-isoxazole-4-carbonyl chloride,
3-methyl-5-(2-thienyl)-4-isoxazole-4-carbonyl chloride,
3-(p-chlorophenyl)-5-methyl-4-isoxazole-4-carbonyl chloride,
3-methyl-5-methylmercapto-4-isoxazole-4-carbonyl chloride,
5-(p-chlorophenyl)-3-methyl-4-isoxazole-4-carbonyl chloride,
3-methyl-5-(o-nitrophenyl)-4-isoxazole-4-carbonyl chloride,
5-isopropyl-3-methyl-4-isoxazole-4-carbonyl chloride, and
5-methyl-3-(p-chlorophenyl)-4-isoxazole-4-carbonyl chloride,
the products obtained are
7-[3,5-diphenyl-4-isoxazolylcarbonylamino]-7-methyldesacetoxycephalosporanic acid,
7-[3-methyl-5-phenyl-4-isoxazolylcarbonylamino]-7-methyldesacetoxycephalosporanic acid,
7-[3,5-dimethyl-4-isoxazolylcarbonylamino]-7-methyldesacetoxycephalsoporanic acid,
7-[5-benzyl-3-methyl-4-isoxazolylcarbonylamino]-7-methyldesacetoxycephalosporanic acid,
7-[3-methyl-5-styryl-4-isoxazolylcarbonylamino]-7-methyldesacetoxycephalosporanic acid,
7-[5-tert. butyl-3-phenyl-4-isoxazolylcarbonylamino]-7-methyldesacetoxycephalosporanic acid,
7-[5-(2-furyl)-3-methyl-4-isoxazolylcarbonylamino]-7-methyldesacetoxycephalosporanic acid,
7-[3-methyl-5-(3',5'-dimethyl-4'-isoxazolyl)-4-isoxazolylcarbonylamido]-7-methyldesacetoxycephalosporanic acid,
7-[3-methyl-5-(2-thienyl)-4-isoxazolylcarbonylamido]-7-methyldesacetoxycephalosporanic acid,
7-[3-(p-chlorophenyl)-5-methyl-4-isoxazolylcarbonylamido]-7-methyldesacetoxycephalosporanic acid,
7-[3-methyl-5-methylmercapto-4-isoxazolylcarbonylamido]-7-methyldesacetoxycephalosporanic acid,
7-[5-(p-chlorophenyl)-3-methyl-4-isoxazolylcarbonylamido]-7-methyldesacetoxycephalosporanic acid,
7-[3-methyl-5-(o-nitrophenyl)-4-isoxazolylcarbonylamido]-7-methyldesacetoxycephalosporanic acid,
7-[5-isopropyl-3-methyl-4-isoxazolylcarbonylamido]-7-methyldesacetoxycephalosporanic acid, and
7-[5-methyl-3-(p-chlorophenyl)-4-isoxazolylcarbonylamido]-7methyldesacetoxycephalosporanic acid, respectively.

EXAMPLE 264

To 100 ml. aqueous solution (pH 8.0) of 10 g. crude 7-amino-7-methyldesacetoxycephalosporanic acid are added 8 g. freshly distilled phenylacetaldehyde. After 2 hours agitation at room temperature, 250 ml. of methyl cyclohexanone are added and the pH adjusted to 4.0 with HCl. After 30 minutes the phases are separated and the rich organic solvent is dried by azeotropic distillation of the water present. The triethylamine salt is prepared by the addition of 6.5 ml. of amine.

The solution is cooled to 0° – 5° and a mixture of 9.5 g. D(–)-2-phenylglycyl chloride hydrochloride in 100 ml. of methyl cyclohexanone is added over a period of 1 hour, maintaining a pH of 0° – 5°C. After an additional hour agitation, 100 ml. cold phosphate buffer at pH 7.5 is added and the pH adjusted to 2.0. The solvent layer is discarded and the aqueous layer adjusted to pH 5.0. After 1 hour, filtration and drying yields 7-methyl-cephalexin.

By substituting the reaction product of sodium D(–)-α-aminophenyl acetate with methyl acetoacetate for the D(–)-2-phenylglycyl chloride hydrochloride in the foregoing procedure, 7-methyl-cephalexin is also produced.

EXAMPLES 265–274

In the procedure of Example 264 the D-(–)-2-phenylglycyl chooride is replaced with an equimolar amount of
α-(1-naphthyl)glycyl chloride,
α-(2-napthyl)glycyl chloride, α-(1-chloro-2-napthyl)glycyl chloride,
α-(2-methyl-7-naphthyl)glycyl chloride,
α-(6-nitro-1-naphthyl)glycyl chloride,
α-(2,7-dibromo-3-naphthyl)glycyl chloride,
α-(4-trifluoromethyl-1-naphthyl)glycyl chloride,
α-(8-iodo-1-naphthyl)glycyl chloride,
α-(1-methoxy-2-naphthyl)glycyl chloride, and
α-(4-acetamido-1-naphthyl)glycyl chloride,
respectively, to produce
7-[α-amino-(1-napthyl)acetamido -7-
methyldesacetoxycephalosporanic acid,
7-[α-amino-(2-naphthyl)acetamido]-7-methyldesacetoxycephalosporanic acid,
7-[α-amino-(1-chloro-2-naphthyl)acetamido]-7-methyldesacetoxycephalosporanic acid,
7-[α-amino-(2-methyl-7-naphthyl)acetamido]-7-methyldesacetoxycephalosporanic acid,
7-[α-amino-(6-nitro-1-napthyl)acetamido]-7-methyldesacetoxycephalosporanic acid,
7-[α-amino-(2,7-dibromo-3-naphthyl)acetamido]-7-methyldesacetoxycephalosporanic acid,
7-[α-amino-(4-trifluoromethyl-1-naphthyl)acetamido]-7-methyldesacetoxycephalosporanic acid,
7-[α-amino-(8-iodo-1-naphthyl)acetamido]-7-methyldesacetoxycephalosporanic acid,
7-[α-amino-(1-methoxy-2-naphthyl)acetamido]-7-methyldesacetoxycephalosporanic acid, and
7-[α-amino-(4-acetamido-1-naphthyl)acetamido]-7-methyldesacetoxycephalosporanic acid, respectively.

EXAMPLE 275

10 g. triethylamine salt of 7-amino-7-methyldesacetoxycephalosporanic acid is dissolved in 100 ml. methylene chloride. The solution is cooled to 0° – 5° and 7 g. 2,6-dimethoxy benzoyl chloride is added dropwise over a period of 1½ hours, maintaining the same temperature. After an additional 30 minutes, the solution is mixed with an equal volume of cold (5° – 10°) phosphate buffer (pH 7.5) to complete the hydrolysis of the intermediate, the pH is adjusted to pH 2.0 and the mixture is agitated for 15 minutes. The aqueous layer is discarded and the acid organic solvent layer is mixed with 50 ml. of cold water and neutralized to pH 7.5 with 20% sodium hydroxide. The aqueous solution is separated and concentrated into 100 ml. methyl isobutylketone. After standing overnight in the cold room, the crystals are filtered and dried to yield 7-methyl-7-(2,6-dimethoxybenzamido)desacetoxycephalosporanic acid.

EXAMPLES 276–282

In the procedure of Example 275 the phenoxyacetyl chloride is replaced by an equimolar amount of
thiophene-2-carboxylic acid chloride,
thiophene-3-carboxylic acid chloride,
furan-2-carboxylic acid chloride,
furan-3-carboxylic acid chloride,
isonicotinyl chloride,
pyrrolidinecarboxylic acid chloride, and
N-methylpiperidine-3-carboxylic acid chloride,
respectively, to produce the sodium salt of
7-(2-thiophene)carboxamido-7-methyldesacetoxycephalosporanic acid,
7-(3-thiophene)carboxamido-7-methyldesacetoxycephalosporanic acid,
7-(2-furan)carboxamido-7-methyldesacetoxycephalosporanic acid,
7-(3-furan)carboxamido-7-methyldesacetoxycephalosporanic acid,
7-isonicotinylcarboxamido-7-methyldesacetoxycephalosporanic acid,
7-pyrrolidinecarboxamido-7-methyldesacetoxycephalosporanic acid, and
7-[3-(N-methylpiperidine)]carboxamido-7-methyldesacetoxycephalosporanic acid, respectively.

EXAMPLE 283

7-Amino-7-allyldesacetoxycephalosporanic acid

Following the procedure of Example 14 but utilizing allyl chloride in lieu of methyl chloride, the desireed product is recovered.

EXAMPLE 284

7-Amino-7-cyclohexyldesacetoxycephalosporanic acid

Utilizing the procedure of Example 14 but substituting cyclohexyl chloride in lieu of methyl chloride, the desired porduct is recovered.

EXAMPLE 285

7-Benzalimino-7-allyldesacetoxycephalosporanic acid, methyl ester

Following the procedure of Example 12 but utilizing an equivalent amount of allyl chloride in lieu of methyl iodide, the desired product is recovered.

EXAMPLE 286

7-Phenylacetamido-7-allyldesacetoxycepthalosporanic acid

Utilixing the procedure of Example 23c but substituting allyl chloride for methyl iodide, the desired product is recovered.

EXAMPLE 287

N-Benzylidene-7-aminocephalosporanic acid, t-octylamine salt 15 grams 7-aminocephalosporanic acid are slurried in 2 liters water and neutralized over a period of 1 to 1½ hours with t-octylamine. The solution is clarified with 11.2 ml benzaldehyde over a period of one-half hour. After 2 hours stirring at room temperature, the solids are filtered off and washed with 100 ml water. The product is dried at 40°C.

EXAMPLE 288

7-Aminodesacetoxycephalosporanic acid, t-butyl ester 0.5 grams 7-aminodesacetoxycephalosporanic acid are dissolved in 15 ml dioxane in a pressure bottle and chilled in dry ice. Then 0.8 ml conc. sulphuric acid are added along with 5 ml isobutylene. The mixture is stirred for 2 hours, at which time it is poured into an ice cold solution of 6 grams sodium bicarbonate in 100 ml water. This mixture is extracted with ethyl acetate several times. The organic extracts are dried over magnesium sulphate and evaporated to leave a solid product.

EXAMPLE 289

7-Aminocephalosporanic acid, t-butyl ester

Following the procedure of Example 288 but substituting 7-aminocepthalosporanic acid for 7-aminodesacetoxycephalosporanic acid, the desired product is recovered.

EXAMPLE 290

N-Benzylidene-7-aminodesacetoxycephalosporanic acid, t-butyl ester 20 m moles 7-aminodesacetoxycephalosporanic acid, t-butyl ester are dissolved in 100 ml benzene and 20 m moles benzaldehyde are added along with a large excess of magnesium sulphate. The reaction was stirred at room temperature for 22 hours at which time the magnesium sulfate is removed by filtration. The solvent was removed by evaporation in vacuo to leave a crystalline solid.

EXAMPLE 291

N-Benzylidene-7-aminocephalosporanic acid, t-butyl ester

Following the procedure of Example 290 but substituting 7-minocephalosporanic acid, t-butyl ester for 7-aminodesacetoxycephalosporanic acid, t-butyl ester.

EXAMPLE 292

7-Benzalimino-7-methylcephalosporanic acid, t-butyl ester

Following the procedure of Example 12 but utilizing N-benzylidene-7-aminocephalosporanic acid, t-butyl ester for 7-benzaliminodesacetoxycephalosporanic acid, methyl ester the desired product is recovered.

EXAMPLE 293

7-Amino-7-methylcephalosporanic acid, t-butyl ester

Utilizing the procedures of Example 17 but substituting the product of Example 292 for 7-benzalimino-7-methyldesacetoxycephalosporanic acid, methyl ester the desired product is recovered.

EXAMPLE 294

7-Phenylacetamido-7-methylcephalosporanic acid

In lieu of the 7-amino-7-methyldesacetoxycephalosporanic acid, methyl ester utilized in Example 21 the product of Example 293 is utilized. The desired product is dissolved in trifluoroacetic acid for 10 minutes at 0°C, then evaporated to yield the desired product, free acid.

What is claimed is:

1. A compound having the formula:

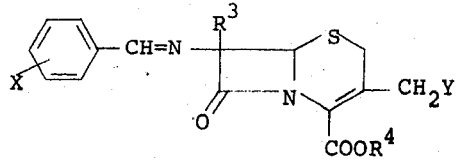

wherein $R_3$ is lower alkyl; $R^4$ is selected from the group consisting of hydrogen, lower alkyl, trichloroethyl, benzyl, methoxybenzyl, and benzhydryl; Y is selected from the group consisting of hydrogen, acetoxy, pyridinium and hydroxy; X is selected from the group consisting of hydrogen, hydroxy, halogen, lower alkyl, lower alkoxy, nitro and amino; and pharmaceutically accptable salts thereof.

2. A compound in accordance with claim 1 wherein $R^3$ is methyl, X is hydrogen and Y is selected from the group consisting of hydrogen and acetoxy.

3. A compound in accordance with claim 2 having the name 7-benzalimino-7-methyldesacetoxycephalosporanic acid, p-methoxybenzyl ester.

4. A compound in accordance with claim 2 having the name 7-benzalimino-7-methylcephalosporanic acid, t-butyl ester.

5. A compound in accordance with claim 2 having the name 7-benzalimino-7methyldesacetoxycephalosporanic acid, methyl ester.

6. A compound in accordance with claim 2 having the name 7-benzalimino-7-methyldesacetoxycephalosporanic acid, benzyl ester.

7. A compound in accordance with claim 2 having the name 7-benzalimino-7-methyldesacetoxycephalosporanic acid, benzhydryl ester.

* * * * *

UNITED STATES PATENT OFFICE
CERTIFICATE OF CORRECTION

Patent No. 3,867,379          Dated February 18, 1975

Inventor(s) Joseph Edward Dolfini et al.

It is certified that error appears in the above-identified patent and that said Letters Patent are hereby corrected as shown below:

Col. 2, line 24, "napthyl" should read --naphthyl--.
Col. 3, line 13, "asa" should read --as--.
Col. 6, line 49, "Utilizing the" should read --A--.
Col. 13, line 20, "aminophenyl-acetamido" should read
  --aminophenylacetamido--.
Col. 16, line 3, "sulfamylbenzamide" should read
  --sulfamylbenzamido--.
Col. 17, line 29, "2iodophenyl" should read --2-iodophenyl--.
Col. 18, line 50, "5p" should read --5-p--.
Col. 18, line 58, "isoxozole" should read --isoxazole--.
Col. 19, after line 2, the following should be inserted:
  --3-methyl-5-β-naphthyl-4-isoxazole-4-carbonyl chloride,--.
Col. 19, line 32, a hyphen (-) should be inserted between
  "4" and "isoxazolylcarbonylamino".
Col. 20, line 5, "isoxazolycarbonylamino" should read
--isoxazolylcarbonylamino--.
Col. 20, line 21, "isoxazolylcarbonlamino" should read
--isoxazolylcarbonylamino--.
Col. 20, line 42, "isoxazolycarbonylamino" should read
--isoxazolylcarbonylamino--.
Col. 20, line 54, "isoxazolycarbonylamino" should read
--isoxazolylcarbonylamino--.
Col. 21, line 6, "5p" should read --5-p--.
Col. 21, line 16, "isoxazolylcarbonlyamino" should read
--isoxazolylcarbonylamino--.
Col. 21, line 45, " 40' " should read --4'--.
Col. 22, line 33, a hyphen (-) should be inserted between
  "7" and "methyldesacetoxycephalosporanic".

UNITED STATES PATENT OFFICE
CERTIFICATE OF CORRECTION

Patent No. 3,867,379                    Dated February 18, 1975

Inventor(s) Joseph Edward Dolfini et al.           Page 2

It is certified that error appears in the above-identified patent and that said Letters Patent are hereby corrected as shown below:

Col. 24, line 21, "desireed" should read --desired--.
Col. 24, line 42, "Utilixing" should read --Utilizing--.
Col. 25, line 25, "7-minocephalosporanic" should read --7-aminocephalosporanic--.

Signed and sealed this 1st day of July 1975.

(SEAL)
Attest:

RUTH C. MASON
Attesting Officer

C. MARSHALL DANN
Commissioner of Patents
and Trademarks